Patented July 19, 1949

2,476,554

UNITED STATES PATENT OFFICE 2,476,554

METHOD OF INHIBITING DETERIORATION OF ORGANIC COMPOUNDS

Bert H. Lincoln, Ponca City, Okla., and Clarence A. Neilson, Linthicum Heights, Md., assignors to Continental Oil Company, Ponca City, Okla., a corporation of Delaware No Drawing. Application April 28, 1944, Serial No. 533,254

4 Claims. (Cl. 260—408)

Our invention relates to a method of protecting and inhibiting oxygen containing organic compounds against discoloration or other deleterious changes during halogenation thereof in the presence of iron or iron compounds.

This is a continuation-in-part of our copending application, Serial No. 384,414, filed March 20, 1941, which matured into Patent No. 2,370,552 on the 27th day of February 1945.

When dry oxygen containing organic compounds are halogenated at elevated temperatures in glass equipment, their color remains practically unchanged. At least, they never become darker than the halogen bearing compound should be. However, when the halogenation process is carried out in equipment having iron exposed to the reaction mixture or in the presence of traces of water and iron or iron compounds such as iron chlorides, the halogenated compounds immediately become black and may undergo other objectionable changes in a short period of time. Such materials are useless in their changed state, and restoration to their original condition is very difficult and expensive if not impossible.

An important object of our invention is to provide a method of preventing deterioration of oxygen containing organic materials during halogenation thereof.

Another object of our invention is to prevent the discoloration of oxygen containing organic compounds by halogenation thereof in the presence of water and iron or iron compounds.

A further object of our invention is to provide an improved method of halogenating oxygen containing organic materials in ferrous equipment.

Other objects and advantages of our invention will appear in the course of the following description.

We have found that the addition of a small amount of various basic nitrogenous organic compounds to the material undergoing halogenation will greatly inhibit or entirely prevent the discoloration and deterioration of the organic materials although large quantities of moisture, iron, and iron chlorides are present. The nitrogenous organic compounds are preferably mixed with the material to be halogenated before the halogenating process is started.

The basic nitrogenous compounds above referred to are of the general formula

where R may be an alkyl, alkylol, aryl, aralkyl, hydroaryl, or heterocyclic radical and R' and R" may be hydrogen, hydroxyl, alkyl, alkylol, aryl, aralkyl, hydroaryl, or heterocyclic radicals. These amines may be either oil or water-soluble. Heterocyclic nitrogen compounds are also suitable. Specific examples of the compounds which may be used are:

I. Aliphatic amines
 1. Amylamine
 2. Diamylamine
 3. Triamylamine
 4. Tributylamine
 5. Cetylamine
 6. Ethanolamine
 7. Diethanolamine
 8. Triethanolamine
 9. Propanolamine
 10. Ethylenediamine
 11. Propylenediamine
 12. Diethylenetriamine
 13. Triethylenetetramine
 14. Tetraethylenepentamine II. Aromatic Amines
 1. Aniline
 2. Methylaniline
 3. Dimethylaniline
 4. Diamylaniline
 5. Toluidine
 6. Xylidine
 7. Diphenylamine
 8. Triphenylamine
 9. Nitraniline
 10. Phenylene diamine
 11. Aminophenol
 12. Aminodiphenyl
 13. Benzidine
 14. Benzamide
 15. Acetanilide
 16. Acet-toluidide
 17. Acetoacetanilide III. Heterocyclic Amines and Nitrogen Bases
 1. Pyridine
 2. Pyrrol
 3. Pyrrolidine
 4. Piperidine
 5. Lutidine
 6. Aminobenzofurane
 7. Morpholine
 8. Benzimidazol
 9. Carbazol
 10. Nicotinic acid
 11. Picoline
 12. Brucine Any of the above, mixtures of the above or various oxygen, halogen, nitrogen, sulfur, or phosphorus derivatives of these compounds may be used within the scope of our invention.

Amounts in the order of from 0.05 to 1 or 2 per cent of the amines are added, based on the amount of material to be halogenated. Some of the more effective nitrogen compounds, however, may be required in smaller amounts and we may use as much as 5 or 10 per cent of some of the amines.

The following examples of applications of our invention are intended to be illustrative only and are not to be construed as limitations.

*Example 1*

In chlorinating a batch of methyl stearate, a small drop of a water solution of iron chloride was introduced into the chlorinating mixture due to the use of a ferrous chlorine line. The chlorinating mixture immediately turned black (the true color above 900) and the batch was therefore ruined. The same operation was repeated with the exception of the introduction of .5 per cent of triethanolamine into the methyl stearate being chlorinated, and then repeated introductions of small amounts of water solution of iron chloride had no effect on the color.

*Example 2*

Upon chlorinating stearic acid in ferrous equipment, the product became extremely black when less than 4 per cent of chlorine had been introduced into the stearic acid. Repeating the experiment but introducing .5 per cent of diethanolamine in the stearic acid permitted chlorinating the stearic acid to approximately 17 per cent total chlorine content, with a finished true color of 3.

*Example 3*

Upon chlorinating diphenyl-oxide in ferrous equipment, the product darkened to a true color of approximately 500. Repeating the experiment but using .5 per cent of triamylamine based upon a total weight of diphenyloxide, we were able to chlorinate the material to a chlorine content of 20 per cent, with a finished true color of 4.

Experiments similar to examples above have been conducted with other oxygen bearing organic compounds with outstandingly good results. Oxygen bearing organic compounds of open chain, closed chain, and of heterocyclic character are included within the scope of our invention. Some of these compounds are:

Aliphatic alcohols
    H butyl alcohol
    isobutyl alcohol
    tertiary butyl alcohol
    amyl alcohol
    isoamyl alcohol
    pentanol 2
    hexanol
    hexanol 3
    diisopropylcarbinol
    lauryl alcohol
    octyl alcohol
    carnaubyl alcohol
    ceryl alcohol
    methyl vinyl carbinol
    propargyl alcohol
    glycol
    glycerol
    erythritol
    vinyl alcohol
    allyl alcohol Carbocyclic alcohols
    cyclobutanol
    cyclohexanol
    methyl cyclohexanol
    tertiary butyl cyclohexanol
    cyclohexandiol 1, 4
    cyclopentanol
    methyl cyclopentanol Phenols
    phenol
    ortho cresol
    meta cresol
    para cresol
    xylenols
    ethyl phenol
    mesitol
    para tertiary butyl phenol
    thymol
    wax substituted phenol Aromatic alcohols
    benzyl alcohol
    phenyl methyl carbinol
    tolyl carbinol
    2, 4 dimethyl benzyl alcohol Aliphatic esters
    methyl stearate
    methyl oleate
    oleyl acetate
    stearyl acetate
    ethyl acetate
    methyl butyrate
    hexyl acetate
    glycol stearate
    glyceryl oleate
    dibutyl malonate
    dipropyl succinate
    mono methyl malonate Aromatic esters
    phenyl benzoate
    benzyl benzoate
    tolyl benzoate
    butyl phthalate
    phenyl sulfonate
    phenyl naphthenate
    methyl benzoate
    stearyl benzoate
    phenyl ester of phenyl acetic acid Aliphatic ketones
    vinyl methyl ketone
    mesityl oxide
    phorone
    methyl heptanone
    stearone
    laurone
    ethylidene acetone Cyclic ketones
    acetophenone
    benzophenone
    cyclohexanone
    propiophenone
    triethylacetophenone Aldehydes, aliphatic and cyclic
    methylethyl acetaldehyde
    valeraldehyde
    isobutyraldehyde
    caprylic aldehyde
    salicylaldehyde
    anisaldehyde
    vanillin
    safrole Ethers, aliphatic and aromatic
    n-propyl ethers
    isopropyl ethers
    methyl tertiary butyl ether Ethers, aliphatic and aromatic—Continued
  cetyl ether
  isoamyl ether
  diphenyl ether
  dibenzyl ether
  diphenylene oxide
  ditolyl ether
  phenyl methyl ether
Nitro compounds
  nitro ethane
  nitro butane
  nitropentane
  nitrobenzene
  dinitrobenzene
  nitrophenol
  o-nitrotoluol
  m-nitrotoluol
  p-nitrotoluol
  nitro xylol
  nitropseudocumol
  nitromesityline After chlorination, the oils are washed with a dilute solution of sodium carbonate to remove free hydrochloric acid. This treatment also serves to remove the amine hydrochlorides and any remaining free amines.

The efficacy of the amines in preserving the color of oxygen containing organic material during chlorination is probably due in part to their being adsorbed on exposed iron surfaces and thereby inhibiting the action of hydrochloric acid on the iron, tending to form ferric chloride. Evidently the color deterioration of the compounds is associated with the formation of iron chlorides, for such organic oxygen compounds chlorinated in the presence of iron chlorides without amines rapidly lose color.

In addition to the foregoing, the amines have another very desirable property of preventing color increase in organic compounds being chlorinated when iron chloride as such is known to be present. We do not know why the amines are still effective in preserving color in the presence of iron chloride, but broad experience has taught us that the amines inhibit some color-forming reaction.

The presence of amines in the halogenation mixture therefore serves the double purpose of inhibiting the attack of hydrochloric acid on the iron reaction vessels and preventing color loss by the oils undergoing chlorination.

Speculations and theories as to the reason for the results obtained are but conjectures as to what probably occurs, and we do not wish to be bound by them except in so far as they are compatible with the truth.

While chlorine and chlorination are specifically referred to, we contemplate the application of our invention in all halogenation processes, regardless of the halogen employed. Brominations, particularly, as well as fluorinations and iodinations may be subjected to the improvements of our invention.

In the appended claims where reference is made to iron, we intend to include not only elemental iron but also compounds of iron.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is therefore to be understood that our invention is not to be limited to the specific details shown and described.

Having thus described our invention, we claim:

1. The method of inhibiting discoloration and deterioration of ethers during chlorination thereof in the presence of iron which comprises adding to the chlorination mixture from about 0.5% to about 2% of an amine.

2. The method of inhibiting discoloration and deterioration of esters during chlorination thereof in the presence of iron which comprises adding to the chlorination mixture from about .05% to about 2% of an amine.

3. The method of inhibiting discoloration and deterioration of organic acids during chlorination thereof in the presence of iron which comprises adding to the chlorination mixture from about .05% to about 2% of an amine.

4. The method of inhibiting discoloration and deterioration of non-acidic organic oxygen compounds during chlorination thereof in the presence of iron which comprises adding to the chlorination mixture from about .05% to about 2% of an amine.

BERT H. LINCOLN.
CLARENCE A. NEILSON.

REFERENCES CITED

The following references are of record in the file of this patent:

UNITED STATES PATENTS

| Number | Name | Date |
|---|---|---|
| 1,679,998 | Voltz | Aug. 7, 1928 |
| 1,890,099 | Smith et al. | Dec. 6, 1932 |

Certificate of Correction

Patent No. 2,476,554. July 19, 1949.

BERT H. LINCOLN ET AL.

It is hereby certified that error appears in the printed specification of the above numbered patent requiring correction as follows:

Column 6, line 26, claim 1, for "0.5%" read .05%;

and that the said Letters Patent should be read with this correction therein that the same may conform to the record of the case in the Patent Office.

Signed and sealed this 6th day of December, A. D. 1949.

[SEAL]

THOMAS F. MURPHY,
*Assistant Commissioner of Patents.*